US008526953B2

(12) United States Patent
Alanara et al.

(10) Patent No.: US 8,526,953 B2
(45) Date of Patent: Sep. 3, 2013

(54) APPARATUS, METHOD AND COMPUTER PROGRAM PRODUCT PROVIDING AUXILIARY HANDOVER COMMAND

(75) Inventors: Seppo M. Alanara, Oulu (FI); Leping Huang, Tokyo (JP); Seppo Vesterinen, Oulunsalo (FI); Lars Dalsgaard, Oulu (FI); Dan Forsberg, Helsinki (FI)

(73) Assignee: Nokia Corporation, Espoo (FI)

( * ) Notice: Subject to any disclaimer, the term of this patent is extended or adjusted under 35 U.S.C. 154(b) by 1356 days.

(21) Appl. No.: 12/075,507

(22) Filed: Mar. 12, 2008

(65) Prior Publication Data

US 2008/0233963 A1    Sep. 25, 2008

Related U.S. Application Data

(60) Provisional application No. 60/906,431, filed on Mar. 12, 2007.

(51) Int. Cl.
*H04W 36/00* (2009.01)
*H04W 4/00* (2009.01)

(52) U.S. Cl.
USPC ........... 455/436; 455/437; 455/438; 455/439; 455/442; 370/331

(58) Field of Classification Search
USPC ................................. 455/436–439; 370/331
See application file for complete search history.

(56) References Cited

U.S. PATENT DOCUMENTS 5,230,082 A * 7/1993 Ghisler et al. ................ 455/438
6,587,680 B1 * 7/2003 Ala-Laurila et al. .......... 455/411

2007/0064948 A1 * 3/2007 Tsirtsis et al. ................ 380/270
2007/0293224 A1 * 12/2007 Wang et al. .................... 455/436
2008/0188219 A1 * 8/2008 Fischer .......................... 455/434

FOREIGN PATENT DOCUMENTS

| EP | 0 899 981 A2 | 3/1999 |
| EP | 0899981 A2 * | 3/1999 |
| WO | WO-2007/004051 A1 | 1/2007 |

OTHER PUBLICATIONS

3GPP TSG-RAN WG2 meeting #53, XP-002489545, R2-061196, Qualcomm Europe, "Cell Switching in LTE_Active State", May 8-12, 2006, Shanghai, China.
3GPP TSG RAN WG2 LTE adhoc, XP003012346, R2-061879, Panasonic, "Necessity of forward handover", Jun. 27-30, 2006, Cannes, France.
3GPP TSG-RAN WG2 Meeting #57, XP-002489546, R2-070454, R2-070009, Nokia, "On the need for forward HO", Feb. 12-16, 2007, St. Louis, USA.

(Continued)

*Primary Examiner* — Huy C Ho
(74) *Attorney, Agent, or Firm* — Harrington & Smith

(57) ABSTRACT

An auxiliary handover message is sent from a target eNB to a UE being handed over from a source eNB. The auxiliary handover message includes a context identifier that is established between the source eNB and the UE, which the source eNB provides to the target eNB during context data exchange when preparing for the handover. The UE uses the context identifier to verify that the auxiliary handover message is valid. Various approaches are detailed for minimizing signaling overhead and minimizing the time the UE must monitor the separate channel for the auxiliary handover message in the event the UE does not properly receive the original handover message from the source eNB. The context identifier may be a random number, a C-RNTI, an eNB-ID, or a token. The auxiliary handover command sent from the target eNB may be the context identifier with or without a copy of the handover command.

21 Claims, 6 Drawing Sheets

(56) References Cited

OTHER PUBLICATIONS

"High Level Comparison of Handover in GSM, UMTS and LTE", 3GPP TSG-RAN meeting #56bis, R2-070213, Jan. 2007, pp. 1-7.
"Simulation Results on Forward Handover", 3GPP TSG-RAN WG2 meeting #56, R2-063281, Nov. 2006, pp. 1-10.
"Radio Resource Control (RRC); Protocol Specification (Release 7)", 3GPP TS 25.331 V7.3.0 (2006), pp. 1-66.
"Evolved Universal Terrestrial Radio Access (E-UTRA) and Evolved Universal Terrestrial Radio Access Network (E-UTRAN); Overall description; Stage 2 (Release 8)", 3GPP TS 36.300 V0.45.0 (2007), 73 pgs.

* cited by examiner ved from FIG. 1 of 3GPP TSG-RAN WG-2 MEETING #56
APPARATUS, METHOD AND COMPUTER PROGRAM PRODUCT PROVIDING AUXILIARY HANDOVER COMMAND

CROSS-REFERENCE TO RELATED APPLICATION

This application claims priority to U.S. Provisional Patent Application No. 60/906,431, filed on Mar. 12, 2007, the contents of which are incorporated herein in its entirety.

TECHNICAL FIELD

The exemplary and non-limiting embodiments of this invention relate generally to wireless communications systems and, more specifically relate to signaling related to a handover of a mobile user device.

BACKGROUND

The following abbreviations are herewith defined:
3GPP third generation partnership project
ARQ automatic repeat request
AS access stratum
BCCH broadcast control channel
BLER block error rate
CQI channel quality information
C-RNTI C-plane radio network temporary identifier
DL downlink (network to UE)
eNB Node B/base station in an evolved UTRAN system
E-UTRAN evolved UMTS radio access network
GSM global system for mobile communications
HARQ hybrid ARQ
HO handover
LTE long term evolution
MME mobility management entity
NW network
PCH paging channel
PDSCCH physical downlink shared control channel
PDSCH physical downlink shared channel
PSTN public switched telephone network
RAT radio access technology
RLC radio link control
RRM radio resource management
RX receive
SAE system architecture evolution
SIB system information block
SNIR signal to noise interference ratio
TX transmit
UE user equipment
UL uplink (UE to network)
UMTS universal mobile telecommunications system
UPE user plane entity
UTRAN UMTS terrestrial radio access network
VoIP voice of internet protocol Handover of a UE between base stations is well known in the art, and different wireless protocols handle specific implementations differently. Known are soft and hard handovers, as well as specific requirements for inter-RAT handovers and handovers between base stations under control of different radio network controllers. Advantages of the invention detailed below are pronounced within the E-UTRAN system and so that system will be discussed as context, though as will be seen the signaling detailed herein may be employed with any wireless protocol that hands over UEs between different network entities. E-UTRAN (commonly termed 3.9G or simply LTE) is a packet-data-based transmission system that supports intra-frequency, inter-frequency and intra-RAT handover. It has been agreed that LTE will use a break-before-make backward hard handover. Soft handover will not be used.

One challenging scenario for executing reliable handovers is termed an urban canyon, shown in FIG. 1A which is reproduced from FIG. 1 of 3GPP TSG-RAN WG-2 MEETING #56 (Qualcomm Europe, 6-10 Nov. 2006, Riga, Latvia). Base stations 1 through 4 control the areas demarcated by the hexagonal dotted lines in which they are respectively centered. The UE path is along the street between BS1 and BS2, and that path spans a cross street depicted. Assume buildings at the corners of the intersection interfere with line of sight signaling between the various base stations and the moving UE. As the UE is at or very near the intersection, its received signal strength from base stations 2 and 3 increases very rapidly, and drops off again as it passes through the intersection and the building again block signals from those laterally disposed base stations.

The problem is particularly detailed at FIG. 1B, reproduced from FIG. 4 of 3GPP TSG-RAN WG-2 MEETING #56BIS (Qualcomm Europe, 16-19 Jan. 2007, Sorrento, Italy). That same document illustrates other scenarios wherein high frequency reuse factors are employed (e.g., GSM and UMTS), but FIG. 1B relates to LTE as is currently developed and seen to be the most challenging urban canyon since LTE uses full or fractional reuse among the various base stations. As the UE approaches the intersection, it will start receiving rapidly increasing signal from eNBs "2" and "3". As the UE enters the intersection, the signal from eNBs "2" or "3" becomes stronger than eNB "1". Assuming that the link between eNB "1" and the UE remains reliable, regardless whether full or fractional frequency reuse is employed it is likely that the network grants handover to one of them, say eNode B "2". As the UE leaves the intersection, the signal strength between eNB "2" and the UE rapidly drops and by the time UE is able to measure its signal strength applying proper filtering, the link with eNB "2", and therefore the link between the network and the UE, is lost. Interruption of service to the UE in the urban canyon scenario as shown in FIG. 1B can be routinely expected when the serving cell is a function of UE location.

Typically, intra-frequency handover is triggered when the UE is at the cell edge of current serving cell. Softer HO (intra-eNB) is an implementation issue for the network alone, and typically will not rely on signaling with the UE other than what is normally required in an inter-eNB handover. In a frequency reuse-1 system such as LTE, the UE may experience strong interference and low SNIR (e.g. <−5 db) in the DL when at or near a cell edge. Given such low SNIR, the BLER of a message after ARQ and HARQ will be still very high in some scenarios such as the urban canyon detailed above. This raises the concern whether HO execution signaling (mainly the HO command in DL) can be reliably transmitted between the eNB and the UE. This is a coverage problem in LTE since unreliable HO signaling can result in the UE losing coverage completely and having to execute cell reselection procedures, which interrupts the user's service and increases control signaling required to re-establish the UE on a cell.

According to preliminary simulation results by the inventors, there is a high probability of a failed (not correctly received by the UE) HO command when the network load is high and/or UE mobility is high (e.g. >30 km/hour), and/or small receiver diversity (e.g. 1 receiver antenna). If the transmission of the HO command failed, the UE will move to the idle state and start cell reselection. The whole procedure due to the failure of the HO command will cause significant service interruption time, and occupy additional bandwidth for UE reestablishment. Frequent radio link failure is especially to be avoided in VoIP applications.

What is needed in the art then is a way to increase the reliability of HO signaling. The above documents from which FIGS. 1A-1B are taken propose a solution that is seen to require significant architectural changes. A more elegant solution is detailed below that is applicable without substantial changes to existing system architecture, whether that system is LTE or otherwise.

SUMMARY

According to an exemplary embodiment of the invention is a method that includes storing a context identifier that is established between a mobile communication device and a source network controlling device, listening on a first channel for an original handover command from the source network controlling device, receiving on a second channel an auxiliary handover command from a target network controlling device, wherein the auxiliary handover command comprises the context identifier, and thereafter authenticating the auxiliary handover command using the stored context identifier and handing over to the target network controlling device. In an embodiment, the source radio network controlling device is a source eNB, the target radio network controlling device is a target eNB, and the mobile communication device is a UE.

According to another exemplary embodiment of the invention is an apparatus that includes a memory, a receiver, a processor and a transmitter. The memory is configured to store a context identifier that is established between the apparatus (which may be a UE) and a source network controlling device. The receiver is configured to listen on a first channel for an original handover command from the source network controlling device, and to receive on a second channel an auxiliary handover command from a target network controlling device, where the auxiliary handover command includes at least the context identifier. The processor is configured to authenticate the auxiliary handover command using the stored context identifier, and the transmitter is configured to hand over the apparatus to the target network controlling device.

According to another exemplary embodiment of the invention is a method that includes establishing a context identifier between a mobile communication device and a source network controlling device. This may be initiated by the mobile communication device (e.g., UE) or by the source radio network controlling device (e.g., source eNB) and various embodiments of the context identifier are given below. Further in the method, the established context identifier is sent to a target network controlling device, and an original handover message is sent to the mobile communication device on a first channel to handover to the target network controlling device.

According to yet another exemplary embodiment of the invention is an apparatus that includes a processor and a transceiver at least. The processor and the transceiver are configured together to establish a context identifier between a mobile communication device and a source network controlling device. For the case where the apparatus of this embodiment establishes the context identifier, a transmitter of the transceiver sends it to the mobile communication equipment. For the case where the mobile communication device of this embodiment establishes the context identifier, a receiver of the transceiver receives it from the mobile communication device. The processor is also configured to send to a target network controlling device the established context identifier and to create an original handover message. A transmitter of the transceiver is configured to send on a first channel the original handover command to the mobile communication device so as to handover the mobile communication device to the target network controlling device.

According to still another exemplary embodiment of the invention is a method that includes receiving at a target radio network controlling device from a source radio network controlling device a context identifier that is established between the source radio network controlling device and a mobile communication device, and sending to the source radio network controlling device a cell radio network temporary identifier that is assigned by the target radio network controlling device to the mobile communication device. Further in this method, an auxiliary handover command that includes the context identifier is sent to the mobile communication device, and the mobile communication device is established with the target network controlling device in a handover from the source radio network controlling device.

And according to another exemplary embodiment of the invention is an apparatus that includes a processor, a transmitter and a receiver. The processor is configured to receive from a source radio network controlling device a context identifier that is established between the source radio network controlling device and a mobile communication device, to assign a cell radio network temporary identifier to the mobile communication device, and to send to the source radio network controlling device the assigned cell radio network temporary identifier. The transmitter is configured to send to the mobile communication device an auxiliary handover command that includes the context identifier. And the receiver is configured to receive from the mobile communication device a handover conform message that establishes the mobile communication device with the apparatus after handover from the source radio network controlling device.

BRIEF DESCRIPTION OF THE DRAWINGS

Embodiments of the invention are detailed below with particular reference to the attached drawing Figures.

Figure 1A:
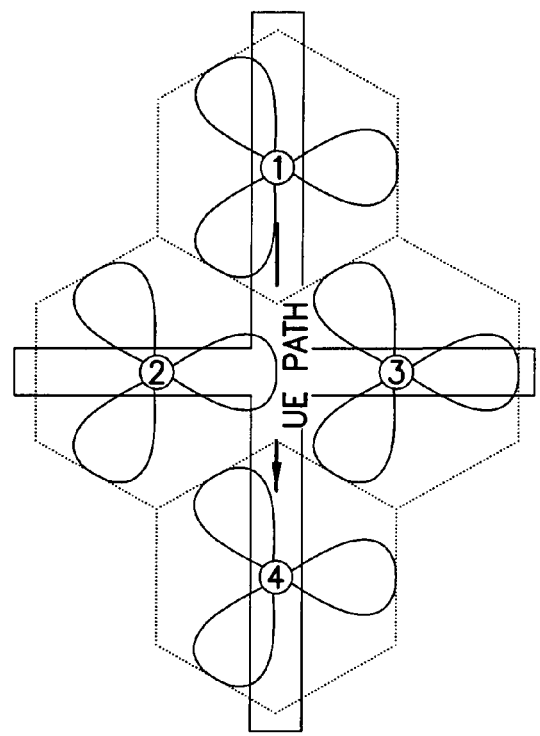
FIG. 1A is a prior art depiction of a UE moving between cells and cell edges in an urban canyon scenario that degrades reliability of UE handovers.
Figure 1B:
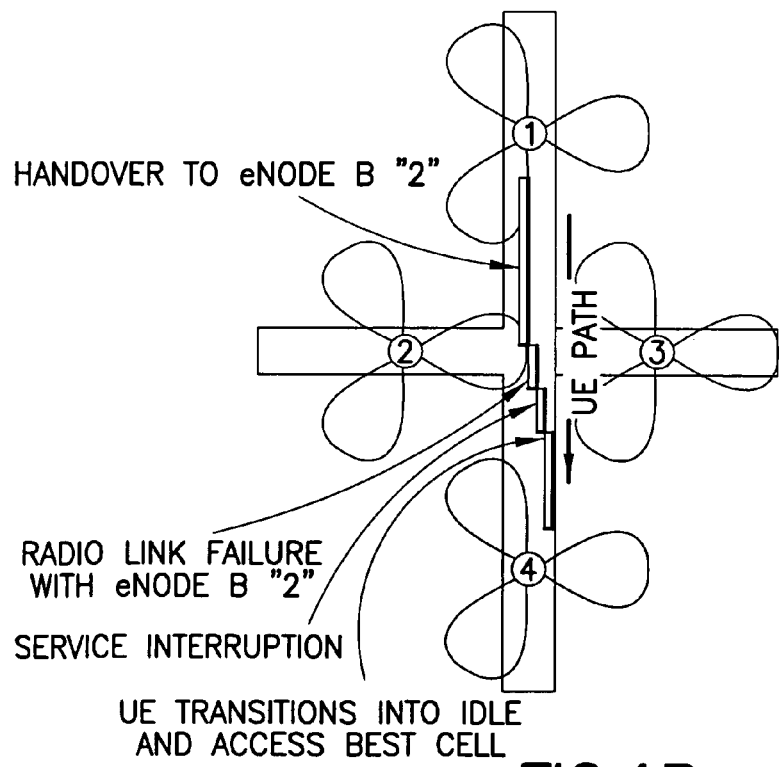
FIG. 1B is similar to FIG. 1A but showing specific handovers and dropped service for the UE.

These and other implementations are detailed more fully below.

DETAILED DESCRIPTION

In the terminology used herein, the source eNB is the serving node B under whose control the UE lies prior to the handover. The target eNB is that eNB to which it is intended that the UE transfer, the eNB identified in the HO command. To avoid confusion, in the description below the target eNB will be referred to always as the target eNB even after the handover is completed and it has become the source eNB. The term eNB is the E-UTRAN embodiment of a generalized network access node.

Currently, the HO command is sent from the source eNB on one DL channel. In an embodiment of this invention, an auxiliary HO command is also transmitted to the UE via another channel as backup to the primary/existing HO command. That 'another' channel may be the target eNB's BCCH, or the PCH in the tracking area. Assuming the original HO command is sent on a PDSCH that is allocated on a physical downlink control channel PDCCH, then for these examples the auxiliary HO command is sent on a different type channel. For the case where the original HO command is sent by one entity on one channel (e.g., from the source eNB on its PDSCH as allocated by the source eNB on its PDCCH) and the auxiliary HO command is sent by a different entity on a channel of the same type (e.g., from the target eNB on its PDSCH as allocated by the target eNB on its PDCCH), the two same-type channels used by the two different entities are in fact different if they do not share the same radio resources. Embodiments of this invention are therefore consistent with the current break-before-make backward HO framework of LTE. If the UE cannot receive the HO command from either of the channels over which the HO command or the auxiliary HO command is sent, the UE then moves to the IDLE state and executes cell reselection procedure to establish itself in the network again.

However, the inventors have identified a potential security problem if just any eNB apart from the source eNB is allowed to create and/or transmit any HO Command. The inventors have identified two such security holes, termed as follows.
  a) Replay Attack: an attacker (an illegitimate eNB for the handover) replays an encrypted HO command to the same UE without knowing its contents.
  b) Fake HO Command attack: attacker creates a fake HO command to attract UEs to its own network.

The various embodiments below detail several signaling regimens that effectively authenticate an auxiliary HO command to avoid or solve the above security concerns. Concisely, the detailed embodiments describe a context ID that is sent, alone or with the auxiliary HO command, on a channel other that used by the source eNB to send the original HO command (e.g., typically the serving cell's PDSCH). The UE 10 is uniquely identified by this context ID, and meanwhile this context ID is shared between only the source eNB and the UE undergoing the handover; other network entities like the MME and the target eNB can not create such a context ID. The UE uses this context ID to authenticate the auxiliary HO command received from other channels. If authentication succeeds, the UE will move to the new cell at once. This will reduce the interruption time that potentially arises from time to time under heavy network load conditions, especially in the urban canyon environment detailed above.

Figure 2:
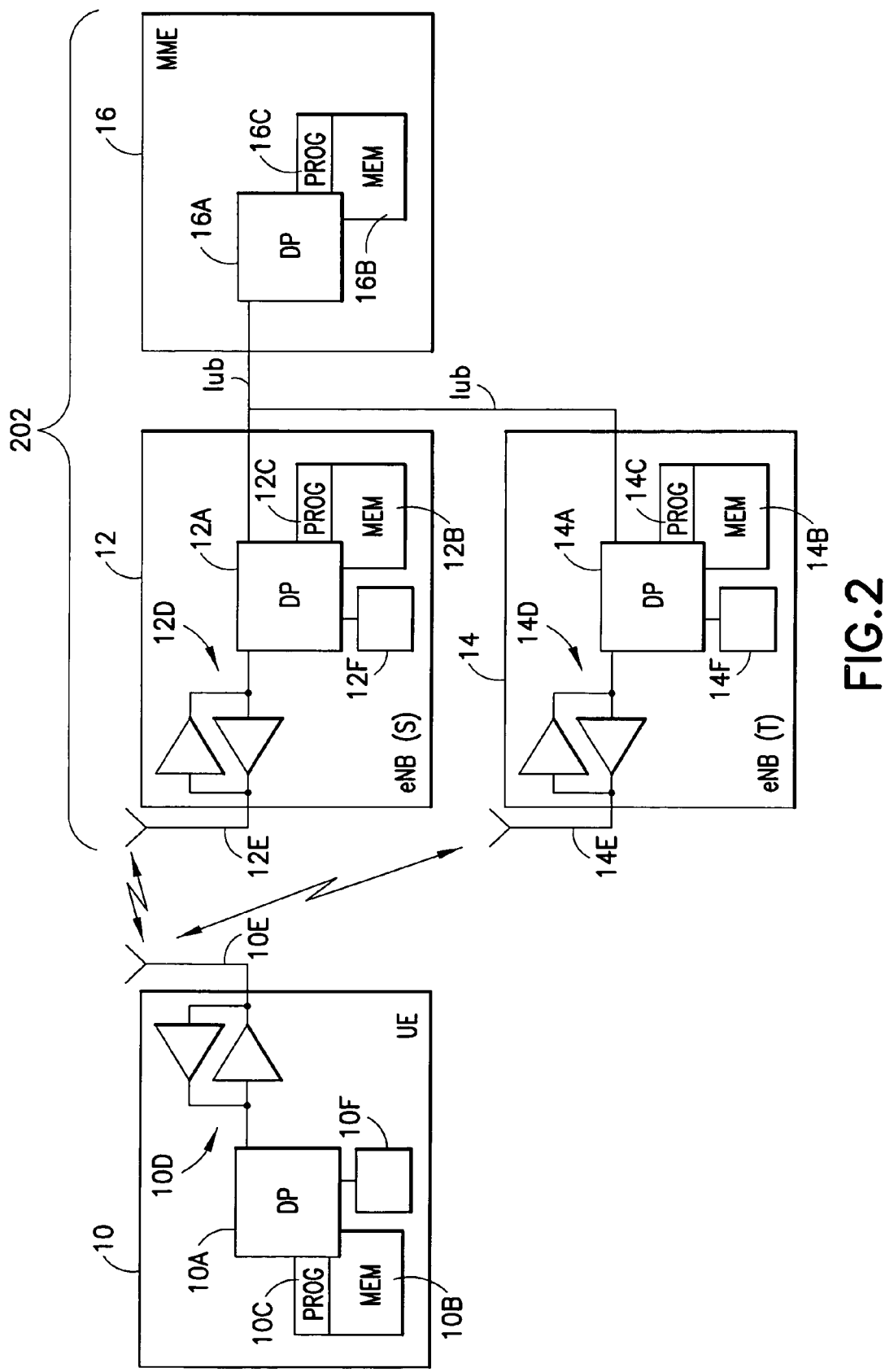
FIG. 2 is a schematic block diagram showing components of various apparatus that are used to implement embodiments of the invention.

Reference is made first to FIG. 2 for illustrating a simplified block diagram of various electronic devices that are suitable for use in practicing the exemplary embodiments of this invention. In FIG. 2 a wireless network 202 is adapted for communication with a UE 10 via a source Node B [eNB (S)] 12 or base station. The network 202 may include a mobility management entity MME 16 or other higher-level radio controller function (e.g., an SAE gateway GW, which replaces the UPE in recent developments of LTE). The UE 10 includes a data processor (DP) 10A, a memory (MEM) 10B that stores a program (PROG) 10C, and a suitable radio frequency (RF) transceiver 10D for bidirectional wireless communications through at least one antenna 10E with the source eNB 12 and with a target eNB [eNB (T)] 14. Multiple wireless channels are active between the UE 10, the source eNB 12, and the target eNB 14, such as using a discontinuous transmission/reception transmission protocol in which the UE 10 camps on a primary frequency and scans other frequencies at other designated times known to the source eNB 12 as is well known in the art. Each of the source eNB 12 and the target eNB 14 includes a DP 12A/14A, a MEM 12B/14B that stores a PROG 12C/14C, a suitable RF transceiver 12D/14D, and one or more antennas 312E/314E.

In the case where both the source eNB 12 and the target eNB 14 access other networks (PSTN, Internet) via the same MME 16, then each are coupled via a data path (e.g., Iub) to the MME 16. In the case where they are not, then each is coupled to its own MME 16 via a data path. Whether through the Iub to a common MME 16, through an Iub between disparate MMEs 16, or through a direct data link (wireless or hardwired), the source eNB 12 and the target eNB 14 exchange messages with one another to effect handover of the UE 10 as detailed below. At least one of the PROGs 10C, 12C and 14C is assumed to include program instructions that, when executed by the associated DP, enable the electronic device to operate in accordance with the exemplary embodiments of this invention, as will be discussed below in greater detail. In particular, the relevant PROGs enable generating and authenticating the context ID, as well as the signaling detailed herein.

Related more specifically to the exemplary embodiments of this invention, the UE 10 is shown to include an authentication unit or module 10F that is assumed to be responsible for the handover authentication feature in accordance with the exemplary embodiments of this invention, and each of the source eNB 12 and the target eNB 14 is assumed to include an authentication units or modules 12F/14F to execute its portion of the handover authentication described herein. The modules 10F, 12F and 14F may be embodied in software, firmware and/or hardware, as is appropriate. In general, the exemplary embodiments of this invention may be implemented by computer software executable by the DP 10A of the UE 10 and the other DPs 12A, 14A of the source eNB 12 and the target eNB 14, or by hardware, or by a combination of software and/or firmware and hardware of those respective apparatus.

In general, the various embodiments of the UE 10 can include, but are not limited to, cellular telephones, personal digital assistants (PDAS) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

Figure 3:
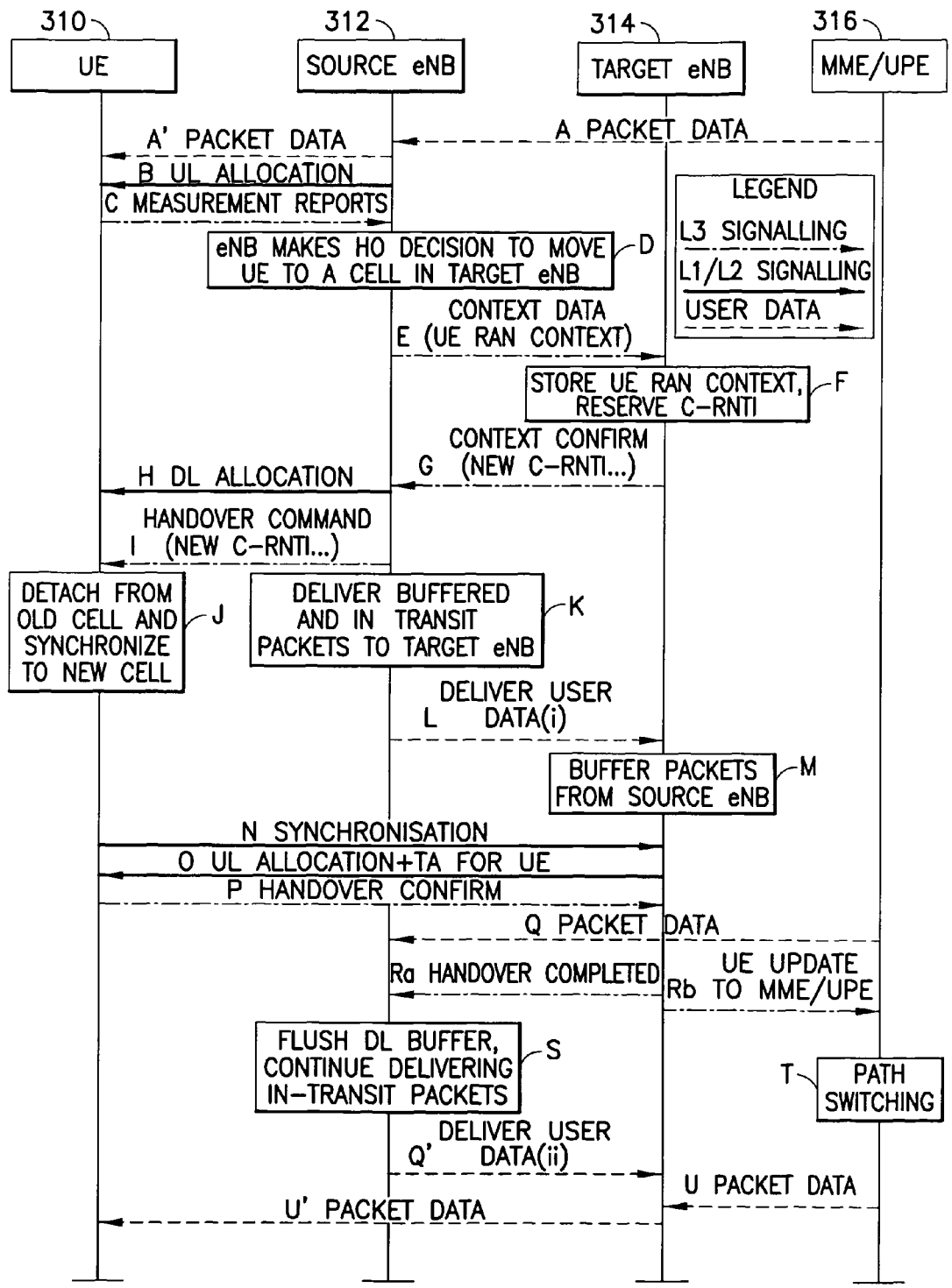
FIG. 3 is a prior art signaling diagram showing signaling for a handover in the current LTE system, taken from section 10.1.2.1 of 3GPP TS 36.300 (v0.45.0, 2007).
Figure 4:
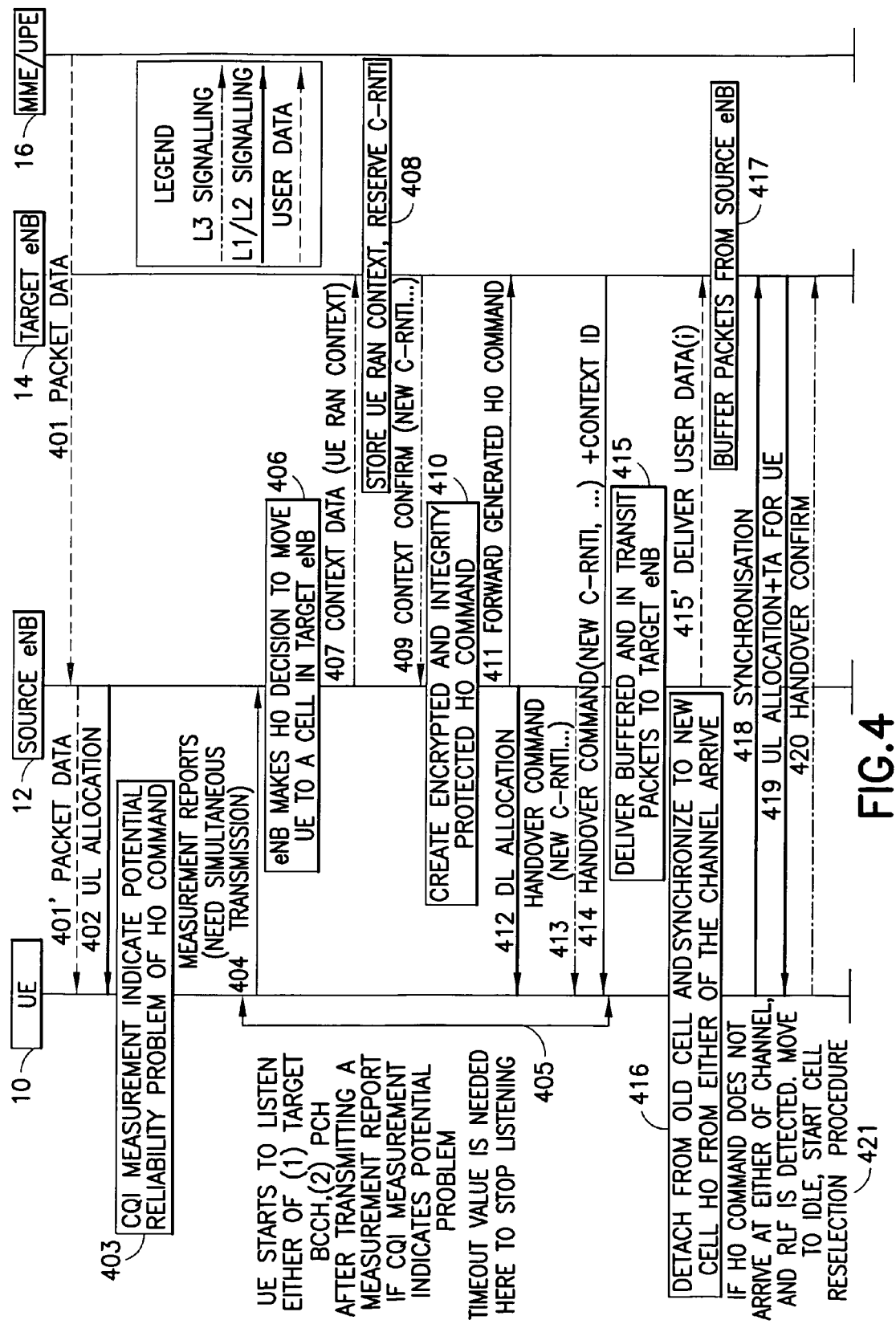
FIG. 4 is a signaling diagram similar to FIG. 2 but showing context ID and a copy of the HO command forwarded to the target eNB according to one embodiment of the invention.
Figure 5:
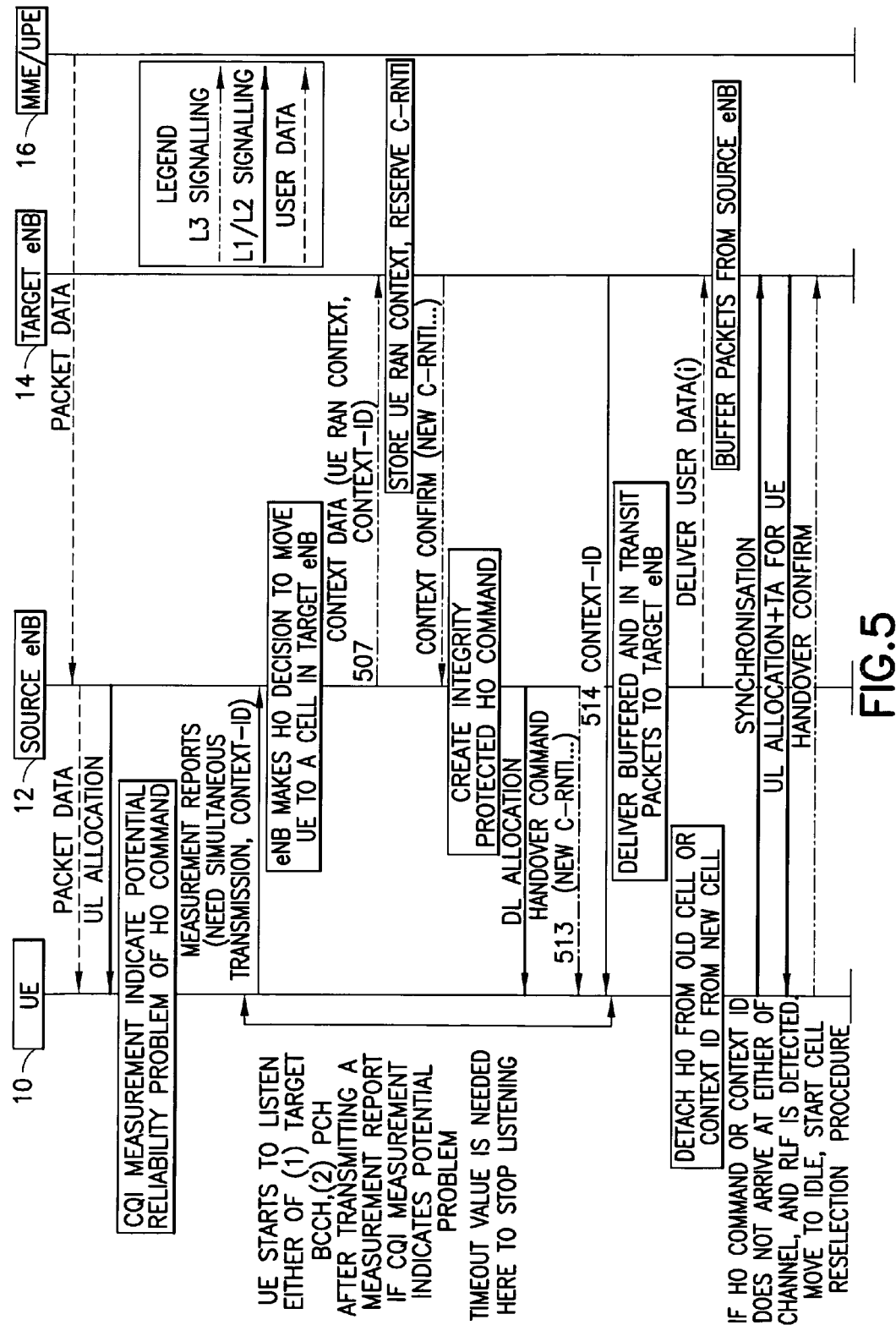
FIG. 5 is similar to FIG. 4 but showing context ID without forwarding a copy of the HO command to the target eNB according to another embodiment of the invention.
Figure 6:
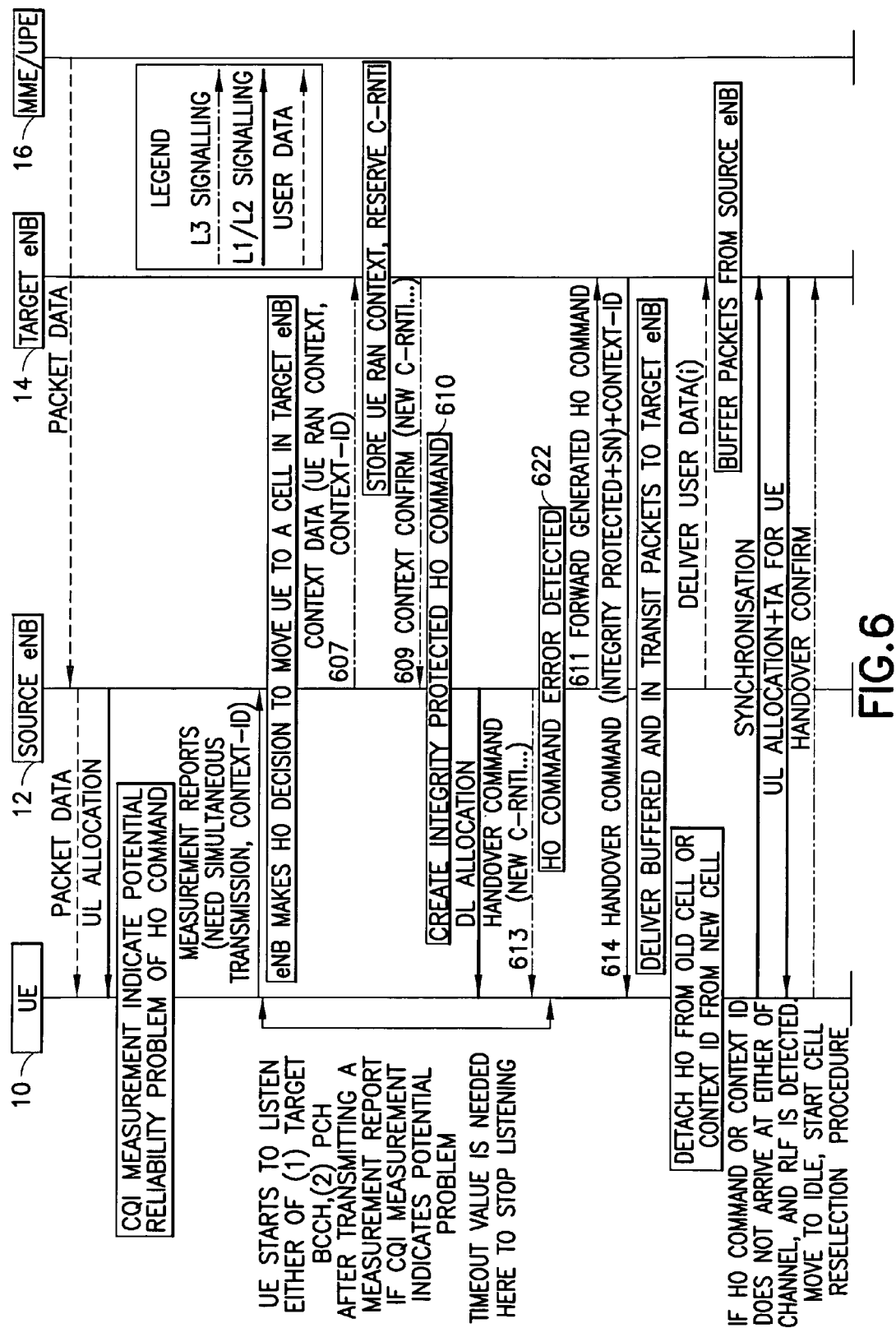
FIG. 6 is similar to FIG. 4 but showing that a copy of the HO command is forwarded to the target eNB only when the source eNB detects failure of the HO command to the UE, according to another embodiment of the invention.

First is described signaling protocol for a handover in LTE as it is currently developed, in order to better clarify the distinctions and advantages of the authentication features detailed at the exemplary embodiments shown in FIGS. 4-6. FIG. 3 shows that current LTE handover signaling, taken from section 10.1.2.1 of 3GPP TS 36.300 (v0.45.0, 2007-02). Shown is the basic handover scenario where neither MME nor UPE changes: the intra E-UTRAN HO in the RRC_CONNECTED state is a UE assisted NW controlled HO, with HO preparation signaling in E-UTRAN. As seen in the legend, user data is represented in dashed lines, layer 3 signaling is represented in lighter solid lines, and layer 1 or layer 2 signaling is represented in darker solid lines.

First, packet data is sent A from the MME 316 to the source eNB 312, and then forwarded A' to the UE 310 on the DL. With that data or separately, the source eNB 312 signals to the UE 310 an uplink resource allocation B. At some point and for any of various reasons, the UE 310 is triggered to send a MEASUREMENT REPORT C, such as by the rules in place for the wireless protocol in use (i.e. system information, specification etc.). The source eNB 312 makes a HO decision D based on the received MEASUREMENT REPORT C (and also RRM information) to hand off the UE 310 to the target eNB 314. The source eNB 312 prepares the target eNB 314 for handover and passes relevant information (context data) in the Handover Request E. This relevant information includes the quality of service QoS profiles of the SAE bearers and possibly the AS configurations of these bearers. The target eNB 14 then stores the received UE RAN context data and reserves a new C-RNTI for the UE at block F. The target eNB 314 prepares for the HO with L1/L2 signaling (not shown), and responds with a CONTEXT CONFIRM message G to the source eNB 312 that includes the reserved (new) C-RNTI and possibly some other parameters (i.e. access parameters, SIBs, etc.). After reception of the CONTEXT CONFIRM message from the target eNB 314 and in preparation of the HO, at block K the source eNB 312 starts forwarding data packets L to the target eNB 314. These packets are buffered at the target eNB 314 at block M for later transmission. The source eNB 312 also sends to the UE 310 its downlink allocation H for the target eNB 314 to be used for completion of the HO.

Next, the UE 310 receives a HANDOVER COMMAND I with the necessary parameters (i.e. new C-RNTI, possible starting time, target eNB SIBs etc.). In LTE, the HO COMMAND message I is sent on the PDSCH of the source eNB 12. Because that is a shared channel, it is subject to the attacks noted above. In certain embodiments, the UE 310 needs to acknowledge to the source eNB 312 reception of the HO COMMAND with an RLC acknowledgment procedure (not shown, and ARQ or HARQ process typically). The UE 310 then detaches J from the source eNB 312 after expiration of the starting time stipulated in the HO COMMAND, and the UE 310 performs synchronization N to the target eNB 314 when the source eNB 314 sends to the UE 310 an uplink allocation with timing advance TA.

The UE 310 responds to the UL allocation and timing advance O by sending a HANDOVER CONFIRM message P to the target eNB 314, which completes handover procedure for the UE 310. At this point, higher nodes in the network (MME/UPE 316) are not yet aware of the handover, and forward packet data Q destined for the UE 310 to the source eNB 312 which is no longer in control of the UE 310. In that case, the source eNB 312 stores that user data in a buffer and as seen below, will forward those buffered packets back to the target eNB 314 at line Q'. The target eNB 314 informs the source eNB 312 of the success of the HO in a HANDOVER CONFIRM message Ra, and also informs the MME/UPE 316 of the completed handover in a UE update message Rb (which may be another copy of the HO CONFIRM message) which gives the MME/UPE 316 the new location of the UE 310. In some instances it is advantageous that the MME/UPE 316 acknowledge receipt with RLC acknowledgment procedures (ARQ or HARQ), so all entities are aware that user data destined for the UE 310 now go through the target eNB 314 rather then the original source eNB 312. In any case, the MME/UPE 316 switches its path T for any user data it receives that is destined for the UE 310.

The source eNB 312 then clears its buffer S of any already-forwarded user data for the UE 310, and forwards Q' to the target eNB 314 any user data for the UE 310 that has not already been sent. Any further user data destined for the UE 310 is sent from the MME/UPE 316 directly U to the target eNB 314, and is then forwarded U' to the UE 310.

The problem arises in that the entire HO procedure relies on the source eNB 312 correctly receiving the measurement report C that triggers the HO, and UE 310 correctly receiving the HO COMMAND I. For example, in the urban canyon scenario, if the UE is attached to base station 2 (less than ideal, but not yet dropped coverage) it may that signal strength between BS2 and the UE drops too fast for BS2 to receive that new measurement report, or that the UE has moved behind a building relative to BS2 and cannot receive the HO COMMAND. Similarly, due to full or partial resource reuse, the UE may be unable to receive the DL allocation or HO COMMAND from BS1 due to interference at the intersection from BS2 and/or BS3, and have to perform cell reselection after losing coverage. In that instance the UE is unaware that BS4 is the intended target cell, and re-selects that BS with the strongest signal at the time of cell reselection.

Now consider a first embodiment of the invention, for which a signaling diagram is shown at FIG. 4, several exchanges of which are not different from identical exchanges seen in FIG. 3. This is an advantage in that embodiments of the invention are easily implemented within existing network architectures. At 401 the MME 16 forwards packet data destined for the UE 10 to the source eNB 12, and at 401' that source eNB 12 sends that user data to the UE 10. The source eNB 12 grants the UE 10 an uplink allocation at 402. By whatever trigger (periodic interval for sending a measurement report, CQI value, serving cell signal level which triggers a measurement report, etc.), the UE 10 is expected to send a measurement report, which it sends at 404. The UE 10 knows from taking that measurement at block 403 that the CQI or measurement that it is next to report falls below some predetermined threshold (e.g., <−5 dB) or changes at a rate exceeding a threshold or some other measure of reliability of the link between the source eNB 12 and the UE 10. The UE 10 begins a timer 405 since it anticipates a situation might arise where it does not receive a HO command while the link with the source eNB 12 is still viable. During the interval given by the timer, the UE 10 monitors another channel from the target eNB 14, over which it expects the auxiliary HO command if one is sent. That 'another' channel can be, for example, the BCCH or PDCCH of the target eNB 14, or the PCH for the area covered by the target eNB 14. In any event, this 'another' channel is not dedicated to the UE 10 because no HO has occurred.

The source eNB 12 receives the measurement report message 404 and makes the decision at block 406 to begin HO procedures of the UE 10 to the target eNB 14. As with FIG. 3, the source eNB 12 sends context data 407 to the target eNB 14, the target eNB 14 stores that context data for the UE 10 and reserves for it a C-RNTI at block 408, then sends back to the source eNB 12 a context confirm message 409 bearing the new C-RNTI reserved in the target cell for the UE 10.

In the embodiment of FIG. 4, and unlike FIG. 3, the source eNB 12 in response to receiving the context confirm message 409 then creates and encrypts 410 an auxiliary HO command, and then forwards it to the target eNB, shown in FIG. 4 as the forward generated HO command 411. This message should be encrypted and integrity protected. Context ID, detailed below, is used to authenticate this message. Now both the target eNB 14 and the source eNB 12 have the context ID that will be used by the UE 10 to authenticate or verify the auxiliary HO Command sent on the 'another' channel by the target eNB 14, detailed below. The source eNB 12 sends a downlink allocation 412 to the UE 10, and also a HO Command 413 as normal. Because the CQI was weak at block 403, the UE 10 may not receive that HO command 413 from the source eNB 12 and by its timer is monitoring the alternate channel over which it can expect the auxiliary HO command. That auxiliary HO command is sent at 414 by the target eNB 14 to the UE 10, such as over the target eNB's BCCH or PCH. The auxiliary HO command 414 includes the context ID which the UE 10 uses to verify it, and in an embodiment the auxiliary HO command 414 is a copy of the original HO command 413 that was previously forwarded at 411 from the source eNB 12 to the target eNB 14. If the normal HO command 413 is properly received by the UE 10, then the UE 10 can either ignore the auxiliary HO command 414 or use it, with the context ID, as a verification of the original 413. In this embodiment the auxiliary HO command 414 carries all necessary HO information that is carried in the original HO command 413, plus the context ID. Since the auxiliary HO command also includes the C-RNTI reserved for the UE 10 in the cell of the target eNB 14, the handover may proceed in the case where the UE 10 receives only the auxiliary HO command 414 and not the original HO command 413.

The remainder of the signaling shown in FIG. 4 is similar to that shown in FIG. 3: any user data stored in the buffers 415 of the source eNB 14 are forwarded to the target eNB 14 at line 415', and buffered 417 at the target eNB 14. The UE 10 then detaches 416 from the source eNB 12 after expiration of the starting time stipulated in the HO command 413/414 (the starting times in both will be the same for the case where the source eNB 12 forwards 411 a copy of the HO command to the target eNB 14) and synchronizes 418 with the target eNB 14, which then sends 419 to the UE 10 an uplink allocation and timing advance. Responsive to receiving that timing advance, the UE 10 sends a handover confirm message 420 to the target UE 14 and the handover is complete. In the event that neither the original HO command 413 nor the auxiliary HO command 414 is received by the UE 10, then the UE has lost coverage (since the CQI at block 403 was low to begin with) and responds by going into IDLE mode and beginning cell reselection procedures 421 to reestablish itself in the network.

Before detailing further embodiments, the context ID is detailed further. The context ID must be able to be known to the UE 10 in order that the auxiliary HO information can be verified, so as to prevent or avoid the potential security breaches noted at the start of this detailed description. One way to generate the context ID can be to use a unique identifier already in use for another purpose apart from HO, for example, the tracking area ID where the UE is located, the source eNB's eNB-ID, the C-RNTI assigned to the UE 10 in the source cell, an access token, or any combination of those identity information. If an access token is used, it should be confidential to network entities other than the UE 10 and the source eNB 12. After it is transmitted over a wireless link once, the access token should be updated to prevent a replay attack. One way to generate such a token is by a random number generator, so in FIG. 2 the authentication unit 12F is a random number generator. The context ID can be created by the UE 10 or by the source eNB 12. For example, the UE 10 can create the context ID and include it with the measurement report 404 sent to the source eNB 404 when this feature is triggered, such as by block 403. The source eNB 12 can also create the context ID, and inform this context ID to the UE 10 when the downlink between the source eNB 12 and the UE 10 is still reliable. For example, the source eNB 12 may generate and assign a context ID to each UE 10 as the UE 10 enters that source eNB's cell, to remain valid until changed or handed over.

FIG. 5 is a first alternative embodiment wherein differences over the embodiment of FIG. 4 are detailed. Notable is that the source eNB 12 doesn't forward a copy of the (encrypted and integrity protected) HO command in FIG. 5. Instead, the context data message 507 is adapted from current LTE protocol to include the context ID. After the source eNB 12 sends to the UE 10 the original HO command 513 with the new C-RNTI reserved for the UE 10 in the target cell, the target eNB 14 sends to the UE 10 a message 514 bearing the context ID that it received with the context data message 507, but not an entire HO message bearing the new C-RNTI. In the embodiment of FIG. 5, the message 514 bearing the context ID is considered to be the auxiliary HO command, because based only on reception of that message the UE 10 executes its handover to the target eNB 14. Though it does not yet have its C-RNTI for the new cell in the target eNB area, the UE 10 knows which eNB to select and need not re-establish itself using the entire cell re-selection procedure as it would if network coverage were lost completely.

As seen above, in one embodiment the integrity protected HO Command plus context ID is transmitted for authentication (FIG. 4), and in another embodiment only the context ID is sent for authentication (FIG. 5). In the latter approach much bandwidth is saved but the UE 10 needs to spend a much longer time on a sideband reading so it can handover to the proper target eNB 14. This causes a longer interruption time. And if the PCH is used as the channel between the target eNB 14 and the UE 10 for HO authentication, then the UE 10 needs to decide the proper target cell by itself. This may cause an additional delay. While the first embodiment of FIG. 4 (auxiliary HO command+context ID) reduces the interruption time, it does so at the cost of increased signaling overhead as compared to the approach of FIG. 5.

FIG. 6 illustrates a variation to FIG. 4 that mitigates some of that excess signaling overhead. Again, only distinctions over FIG. 4 are detailed. As with FIG. 5, the context data message 607 of FIG. 6 includes the context ID. After receiving the context confirm message 609, the source eNB 12 creates the integrity protected HO command 610 but in this case sends it only to the UE 10 613. At block 622, an error is detected and the source eNB 12 concludes that the UE 10 did not receive the HO command 413, such as by failure to receive an ARQ or HARQ message from the UE 10 within a certain time constraint according to protocol. In the embodiment of FIG. 6, the source eNB 12 conditions whether or not it forwards a copy of the HO command 611 to the target eNB 14 on whether or not it detects an error in the original HO command 613 sent to the UE 10. If error is detected 622, the source eNB 12 sends a copy of the HO command 611. Responsive to receiving that HO command 611, the target eNB 14 then sends the auxiliary HO command 614 to the UE 10, which includes the new C-RNTI reserved for it in the target cell and the context ID. Because the auxiliary HO command 614 carries the context ID, the UE 10 can verify it and complete the handover to the target eNB 14 as previously described.

Various transmission channels can be used for sending the auxiliary HO command (or context ID only in the embodiment of FIG. 5). The target eNB's BCH or the tracking area's PCH (the entire tracking area of the target eNB, not just the cell to which the UE 10 is to be handed over) have been previously noted as viable candidate channels. An alternative is to distribute the auxiliary HO command only in the cells that are regarded as the most potential target cells for the UE (e.g. those cells surrounding the current serving cell). By using target cell's BCH, we imply that the UE 10 should have some reasonable guess about the target cell already, before receiving the auxiliary HO command. But the guess by the UE 10 may be different than the HO decision made by source eNB 12. In such a case, the UE 10 may miss this auxiliary HO command altogether. Then the UE 10 would need to start normal cell reselection procedure. The benefit of this approach is less signaling overhead. By using the tracking area's PCH, the UE 10 has a higher probability to receive this auxiliary HO command, but the disadvantage is that larger signaling overhead is required (signaling on all cells in the tracking area, not just the one to which the UE 10 is being handed over). Other means for distribution than BCH or PCH may be possible. Further, overall signaling overhead increases can be minimized by employing implementations of this invention such as shown in FIGS. 4-6 only on the condition detailed in block 402, when the CQI measure indicates there might be a problem with reliability of the HO command 413 yet to be sent from the source eNB 12 to the UE 10.

Two different responses by the UE 10 are within these teachings, as either will serve to complete the handover using the auxiliary HO message detailed in embodiments above. After the UE 10 authenticates the auxiliary HO command, the UE 10 can be required to send a HANDOVER_CONFIRM message to the target eNB 14 to ensure that the handover is complete. As an alternative, the UE 10 can instead send a RRC_CONNECTION_ESTABLISHMENT message to the target eNB 14 after receiving/verifying the auxiliary HO Command.

Exemplary embodiments of the invention then provide a method, apparatus and computer program embodied in a memory, in the case where an original HO command is sent from a source network controlling device (such as the described source eNB 12) to a mobile communication device (such as the described UE 10) on one channel, for using a context identifier (which may be sent alone or in the same message with an auxiliary HO command) that is sent on another channel between a target network controlling device (such as the described target eNB 14) and the mobile communication device to verify either the original HO command or the auxiliary HO command. The another channel can be the BCCH or PCH or some common channel of the target network controlling device, as opposed to a dedicated channel. The auxiliary HO command may include both a copy of original HO command message (transmitted from source network controlling device to the mobile communication device) and the context ID, or only the context ID without HO command message. The auxiliary HO command may be used only in the case where a reported CQI from the mobile communication device is below a threshold value, when the network load is above a threshold, or some other indication that there is a reduced level of confidence that of the original HO command from the source network controlling device to the mobile communication device may not be properly received. The context ID uniquely identifies the mobile communication device, it is shared between only the source network controlling device and the mobile communication device until given to the target network controlling device by the source network controlling device, and can be generated by the mobile communication device or by the source network controlling device. Embodiments of the invention include a UE 10 as mobile communication device, a source eNB 12 as the source network controlling device, and a target eNB 14 as the target network controlling device, where those devices are configured to signal and to be responsive to received signals as shown at FIGS. 4-6.

Further, while described in the context of LTE, it is within the scope of the exemplary embodiments of this invention to use the above described UE 10 and source eNB 12 and target eNB 14 procedures for other types of wireless systems, such as GSM, UMTS, OFDM (orthogonal frequency division multiplex) based systems like WiMAX, WCDMA and the like. The embodiments detailed above are exemplary and non-limiting to the broader teachings of the invention.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation such as the signaling diagrams of FIGS. 4-6, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Those signaling diagrams may also represent method steps or actions of a computer program for the respective UE 10, source eNB 12, target eNB 14, and/or MME/SAE GW 16 as shown, where one step or action shown is conditional on a previously illustrated step or action or receipt of a message.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   storing a context identifier that is established between a mobile communication device and a source network controlling device,
   where the context identifier further uniquely identifies the mobile communication device;
   listening on a first channel for an original handover command from the source network controlling device;
   receiving on a second channel an auxiliary handover command from a target network controlling device, wherein the auxiliary handover command comprises the context identifier;
   authenticating the auxiliary handover command using the stored context identifier; and
   in response to authenticating the auxiliary handover command, handing over to the target network controlling device.

2. The method of claim 1, wherein the original handover command comprises a cell radio network temporary identifier for use with the target network controlling device, and the auxiliary handover command is a copy of the original handover command with the context identifier.

3. The method of claim 1, wherein the auxiliary handover command comprises the context identifier and does not include a cell radio network temporary identifier that is assigned from the target network controlling device to the mobile communication device.

4. The method of claim 1, wherein the first channel is a physical downlink shared channel, and the second channel is one of a broadcast channel of the target network controlling device or a paging channel for a tracking area that includes the target network controlling device.

5. The method of claim 1, wherein the context identifier is received by the mobile communication device from the source network controlling device.

6. The method of claim 1, wherein the context identifier is established by the mobile communication device and sent to the source network controlling device with a measurement report, and wherein:
   listening for the original handover command on the first channel is for a time interval that begins with the sending of the measurement report; and
   receiving the auxiliary handover command on the second channel is after the time interval lapses.

7. The method of claim 1, wherein the context identifier comprises one of: a tracking area identifier for a tracking area in which the mobile communication equipment is located; an identifier for the source network controlling device; a cell temporary identifier assigned from the source network controlling device to the mobile communication device; and an access token.

8. The method of claim 1, wherein the received auxiliary handover command is encrypted, and wherein handing over to the target network controlling device comprises sending to the target network controlling device a handover confirm message.

9. An apparatus comprising at least one processor; and at least one memory including computer program code, the at least one memory and the computer program code configured to, with the at least one processor, cause the apparatus to perform at least the following:
   to store a context identifier that is established between the apparatus and a source network controlling device,
   where the context identifier further uniquely identifies the apparatus;
   to listen on a first channel for an original handover command from the source network controlling device;
   to receive on a second channel an auxiliary handover command from a target network controlling device, wherein the auxiliary handover command comprises the context identifier;
   to authenticate the auxiliary handover command using the stored context identifier; and
   to hand over the apparatus to the target network controlling device in response to authenticating the auxiliary handover command.

10. The apparatus of claim 9, wherein the original handover command comprises a cell radio network temporary identifier for use with the target network controlling device, and the auxiliary handover command is a copy of the original handover command with the context identifier.

11. The apparatus of claim 9, wherein the auxiliary handover command comprises the context identifier and does not include a cell radio network temporary identifier assigned from the target network controlling device to the mobile communication device.

12. The apparatus of claim 9, wherein the first channel is a physical downlink shared channel, and the second channel is one of a broadcast channel of the target network controlling device or a paging channel for a tracking area that includes the target network controlling device.

13. The apparatus of claim 9, wherein the at least one memory and the computer program code are further configured to cause the apparatus to receive the context identifier from the source radio network controlling device.

14. The apparatus of claim 9, wherein the at least one memory and the computer program code are further configured to cause the apparatus
   to establish the context identifier,
   to send the context identifier to the source network controlling device with a measurement report,
   to listen for the original handover command on the first channel for a time interval that begins when the measurement report is sent, and
   after the time interval lapses, to receive the auxiliary handover command on the second channel.

15. The apparatus of claim 9, wherein the context identifier comprises one of: a tracking area identifier for a tracking area in which the mobile communication equipment is located; an identifier for the source network controlling device; a cell radio network temporary identifier assigned from the source network controlling device to the mobile communication device; and an access token.

16. The apparatus of claim 9, wherein the received auxiliary handover command is encrypted and the at least one memory and the computer program code are further configured to cause the apparatus to decrypt the encrypted auxiliary handover command, and to hand over to the target network controlling device by sending to the target network controlling device a handover confirm message.

17. A method comprising:
   establishing a context identifier between a mobile communication device and a source network controlling device,
   where the context identifier further uniquely identifies the mobile communication device;
   sending to a target network controlling device the established context identifier; and
   sending on a first channel an original handover command to the mobile communication device to handover to the target network controlling device;

receiving from the target network controlling device a cell radio network temporary identifier which is included with the handover command sent on the first channel to the mobile communication device, and wherein the established context identifier is sent to the target network controlling device with a copy of the original handover command;

wherein the copy Of the original handover command is sent to the target network controlling device only if it is determined that the original handover command was not properly received by the mobile communication device.

18. An apparatus comprising:

at least one processor; and at least one memory including computer program code, the at least one memory and the computer program code configured to, with the at least one processor, cause the apparatus to perform at least the following:

to establish a context identifier between a mobile communication device and a source network controlling device, where the context identifier further uniquely identifies the mobile communication device;

to send to a target network controlling device the established context identifier;

to create an original handover message; and to send on a first channel the original handover command to the mobile communication device to handover to the target network controlling device;

wherein the at least one memory and the computer program code are further configured to cause the apparatus to receive from the target network controlling device a cell radio network temporary identifier which is included in the created original handover command that is sent on the first channel to the mobile communication device, and to send the established context identifier to the target network controlling device with a copy of the original handover command; and wherein the at least one memory and the computer program code are further configured to cause the apparatus to send the copy of the original handover command to the target network controlling device only if it is determined that the original handover command was not properly received by the mobile communication device.

19. A method comprising:

receiving, at a target radio network controlling device from a source radio network controlling device, a context identifier that is established between the source radio network controlling device and a mobile communication device, where the context identifier further uniquely identifies the mobile communication device;

sending, from the target radio network controlling device to the source radio network controlling device, a cell radio network temporary identifier that is assigned by the target radio network controlling device to the mobile communication device;

sending, from the target radio network controlling device to the mobile communication device, an auxiliary handover command that includes the context identifier; and establishing the mobile communication device with the target network controlling device in a handover from the source radio network controlling device.

20. The method of claim 19, wherein the auxiliary handover command comprises the context identifier and a copy of an original handover command that is received at the target radio network controlling device from the source radio network controlling device.

21. An apparatus comprising at least one processor; and at least one memory including computer program code, the at least one memory and the computer program code configured to, with the at least one processor, cause the apparatus to perform at least the following:

to receive, from a source radio network controlling device, a context identifier that is established between the source radio network controlling device and a mobile communication device, where the context identifier further uniquely identifies the mobile communication device;

to assign a cell radio network temporary identifier to the mobile communication device;

to send, to the source radio network controlling device, the assigned cell radio network temporary identifier;

to send, to the mobile communication device, an auxiliary handover command that includes the context identifier; and to receive, from the mobile communication device, a handover conform message that establishes the mobile communication device with the apparatus after handover from the source radio network controlling device.

* * * * *